United States Patent [19]
Okinaka et al.

[11] Patent Number: 5,762,862
[45] Date of Patent: Jun. 9, 1998

[54] METHOD FOR FIRING CERAMIC FORMS

[75] Inventors: Hideyuki Okinaka, Toyanaka; Yasuo Wakahata, Katano; Toru Fukada, Hirakata, all of Japan

[73] Assignee: Matsushita Electric Industrial Co., Ltd., Osaka, Japan

[21] Appl. No.: 744,502

[22] Filed: Nov. 7, 1996

[30] Foreign Application Priority Data

Nov. 9, 1995 [JP] Japan .................. 7-290974

[51] Int. Cl.$^6$ .................................. C04B 33/32
[52] U.S. Cl. .................. 264/605; 264/654; 264/658
[58] Field of Search .................. 264/605, 654, 264/658

[56] References Cited

U.S. PATENT DOCUMENTS 4,919,867  4/1990  Konigs et al. ............... 364/605

*Primary Examiner*—Christopher A. Fiorilla

[57] ABSTRACT

The invention is directed to a method of firing ceramics and a furnace for manufacturing ceramics. Ceramic forms are first fired in a cylindrical heat resistant container in a furnace core tube by using a lateral tubular furnace to increase their mechanical strength. Then, the container is rotated while the ceramic forms are fired further in a predetermined temperature region, which includes a maximum temperature. In this manner the ceramic forms are heated in a uniform state, both thermally and atmospherically, while receiving moderate impact by rotation, and defective appearance and fluctuations in the characteristics of the ceramics are suppressed. In particular, the container is rotated within a temperature region which is higher than the temperature used to start increasing the mechanical strength of the ceramic forms. Further, the ceramic forms can be packed into the container at a higher rate during the rotation portion of the process than during the first firing.

22 Claims, 10 Drawing Sheets

"PRIOR ART"

METHOD FOR FIRING CERAMIC FORMS

BACKGROUND OF THE INVENTION

1. Field of the Invention

The present invention relates to a furnaces for firing ceramics and methods for firing ceramics.

2. Prior Art

To fire ceramics, generally, a box-shaped electric furnace is used. In particular, as shown in FIG. 10, a plurality of blocks of ceramic forms 102, stacked up in plural vertical or lateral layers in a saggar 101, are charged into the furnace, and fired for 20 to 50 hours. However, in this arrangement, the saggar 101 and ceramic forms 102 may react with each other during the firing process. To prevent this, a separator 103 or powder is used. To prevent a mutual sticking of the ceramic forms, powder may be also sprinkled over the forms.

Further, in such a ceramic firing method, due to the difference in position of the saggar 101, the difference between the central part and the peripheral part of the saggar 101, or the stacking position of the ceramic forms 102 stacked up in vertical or lateral layers, a temperature difference will occur. As a result, the firing atmosphere tends to be uneven. Therefore, individual ceramic forms 102 undergo different thermal hysteresis, by being fired in a different atmosphere, and sometimes, the composition distribution in the ceramic forms may be non-uniform. The fired ceramics will differ in deformation and other characteristics. Besides, since the ceramic forms 102 are overlaid and fired at high temperature, if powder is sprinkled, the ceramics will often stick to each other.

An attempt has been made toward improving the fluctuations of thermal hysteresis, or atmosphere, or non-uniformity of composition distribution due to the firing of ceramic forms 102 by placing them in the saggar 101 described above. In Japanese Laid-open Patent 61-101469, it is proposed to fire ceramic forms while rotating and stirring the forms. Specifically, the ceramic forms 112 are placed in a capsule 111, as shown in FIG. 11. In this method, heat is fed continuously into the furnace core tube, which rotates the tubular capsule. However, the capsule is rotated even when the mechanical strength of ceramic forms is extremely low due to the loss of binder by burning in the midst of firing. As a result, the ceramic forms are likely to be broken by the impact of rotation. The rate of breakage is particularly large when the firing ceramic forms are thin sheets or slender columns. Also, if fired by once calcining the ceramic forms to raise their mechanical strength, the forms are still continuously stirred during the firing process, causing the ceramic forms to collide against each other. As a result, surface wear of the ceramic forms is promoted, problems occur in appearance and in electrode formation, and cuts and defects are likely to take place. Moreover, the powder generated by the abrasion of the ceramic forms reacts with the capsule to stick on the inner wall of the capsule. As a result, the inner wall of the capsule may be roughened, or a chemical reaction may be promoted to break the capsule. To avoid this, the rotating speed of the capsule may be lowered. However, then the stirring is insufficient, and sticking, deformation or other defects may occur, the non-uniformity will increase, or other new problems may occur.

On the other hand, Japanese Laid-open Patent 6-273051 discloses, as shown in FIG. 12, a method of calcining and firing, while stirring ceramic forms 123, by disposing a bar 122 along the axis of rotation and displaced from the axial center, in an internal space of a furnace core tube 121 of a continuous heat treatment furnace. The furnace core tube rotates in the peripheral direction. In this method, the ceramic forms are fired while being rotated continuously throughout the process, and also stirred by the bar. According to this method, the problems pointed out above with respect to the method of Japanese Laid-open Patent 61-101469 are further emphasized. In addition, since the ceramic forms are sent into the furnace core tube in bulk state, it is difficult to equalize the thermal hysteresis of the individual ceramic forms, and the non-uniformity of composition is further encouraged.

Besides, the method disclosed in Japanese Laid-open Patent 61-101469 involves another problem. In particular, in order to prevent the ceramic forms 112 from spilling over or covering the air passage holes 113 in the central part of the capsule 111, ceramic forms 112 can be packed to only about 40% of the apparent volume percentage. By contrast, in the method disclosed in Japanese Laid-open Patent 6-273051, which does not use the capsule, the furnace core tube can be massively packed with ceramic forms. However, as the packing amount increases, the weight of the ceramic forms increases, which in turn causes the ceramic forms to increase their breakage and surface abrasion generated by the continuous rotation of the furnace core tube during the firing process. Also, the filling rate of the ceramic forms in the furnace core tube cannot be raised sufficiently.

The present invention is intended to solve the problems described above, and it is an object herein to present a method of firing ceramics and a furnace for manufacturing ceramics with advanced mass producibility, while minimizing appearance defects and characteristic fluctuations such as sticking, deformation, breakage, and surface abrasion in the ceramics.

SUMMARY OF THE INVENTION

According to the present invention, a method of firing ceramics is characterized by first raising the mechanical strength of the ceramic forms by promoting sintering, and then firing the strengthened ceramics while rotating a cylindrical heat resistant container containing the ceramics about a horizontal central shaft, in a specific temperature range, including a maximum temperature that enhances the characteristics of the ceramic forms According to this method, the ceramic forms are fired while being rotated after the ceramics have begun to be strengthened. As a result, the forms are both thermally and atmospherically uniform, and their contact with the cylindrical heat resistant container is not limited to a specific portion. Uniformity in the composition of the forms is enhanced. Fluctuations in the characteristics of the forms, such as, deformation and other defects is suppressed. Moreover, the mutual sticking of the ceramic forms is suppressed without having to sprinkle powder. Further, by limiting the rotation of the container to a temperature range within a temperature region higher than that at which the mechanical strength of ceramic forms was increased, breakage of the ceramics was suppressed compared to processes that pack ceramic forms to a high apparent volume percentage or that stir the forms violently by rotation. Further, problems due to sticking of powder generated by abrasion on the cylindrical heat resistant container, or due to a reaction therein, were decreased. According to the present invention, sticking, warping, cuts, surface roughness, deformations or other defects can be suppressed, and the uniformity in the characteristics of the forms may be easily enhanced. The present invention is particularly effective when the ceramic forms are thin sheets or slender columns.

According to an aspect of the invention, the cylindrical heat resistant container, has an inner diameter of 1.5 times or more longer than the longest dimension of a portion of the ceramic forms. The container is filled with ceramic forms to an apparent volume percentage of 40% or more during the mechanical strengthening portion of the method, and to an apparent volume percentage of less than 90% during the rotation and firing portion of the method. The mechanical strength of the ceramic forms is increased by calcining, baking or firing the ceramics at a lower temperature than a further firing temperature. After the ceramic forms are fired to begin increasing their mechanical strength, the ceramics are further fired while the cylindrical heat resistant container is rotated about a horizontal central axis, within a specific temperature range including a maximum holding temperature.

The ceramic forms include plate forms, disc forms or column form ceramic forms. The cylindrical heat resistant container may comprise the soaking portions of a furnace core tube of a horizontal tubular furnace and heat resistant lids at both ends.

According to another aspect of the invention, the cylindrical heat resistant container makes a seesaw movement by periodically inverting the inclination of rotary shaft of the furnace core tube, while the tube is rotating. The furnace core tube is continuously or intermittently rotated at a rate of 0.01 to 10 revolutions per minute.

Ceramic forms are preferred to be composed of ceramic material accompanied by generation of liquid phase in the baking process.

This method is notably effective for suppressing sticking, warp, cuts or defects of the ceramic forms, decreasing surface roughness, and improving the uniformity of the electric characteristics.

The invention itself, together with further objects and attendant advantages, will best be understood by reference to the following detailed description taken in conjunction with the accompanying figures.

DETAILED DESCRIPTION OF THE INVENTION

Hereinafter, the present invention is described in terms of embodiments (1)–(14) with reference to FIGS. 1–13.

Embodiment (1)

Figure 1:
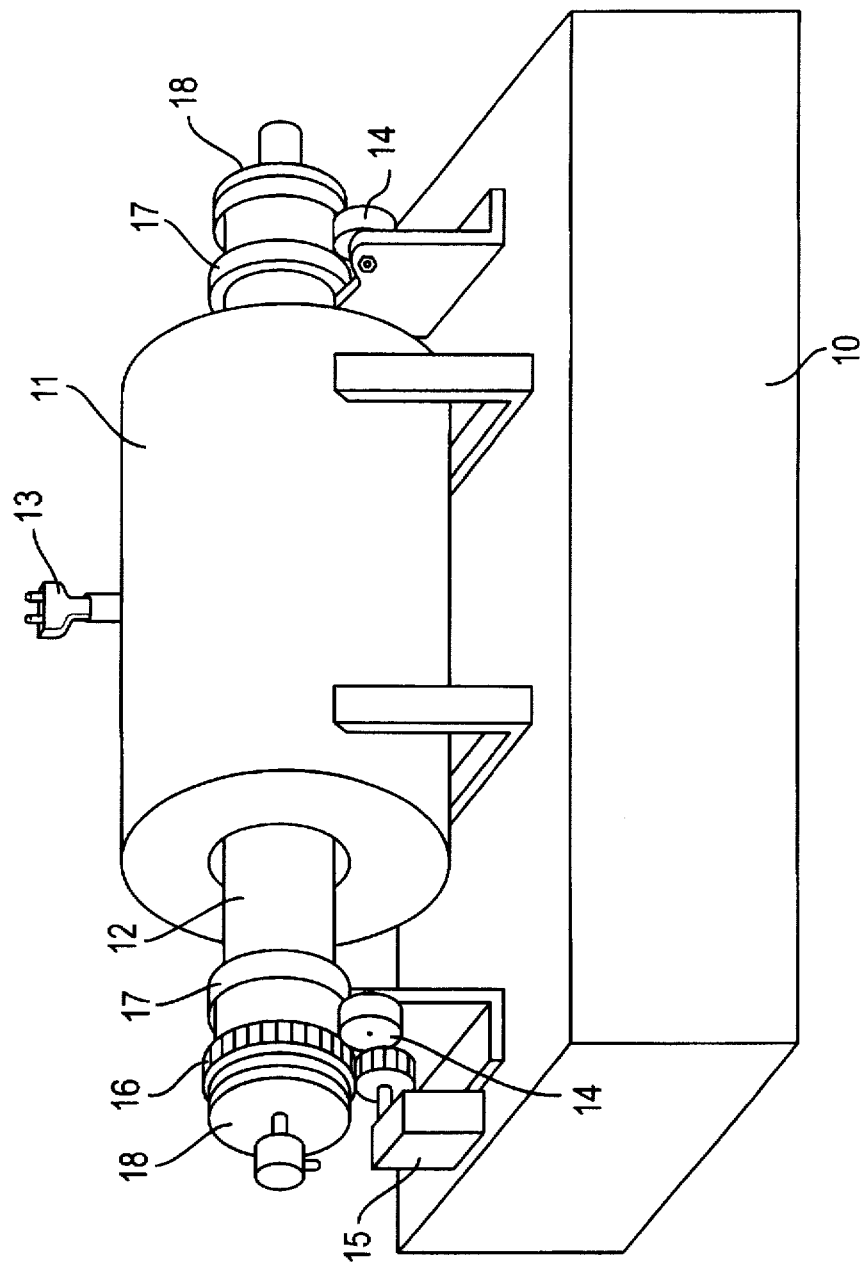
FIG. 1 is a schematic diagram of a horizontal tube type furnace in embodiment (1).
Figure 2:
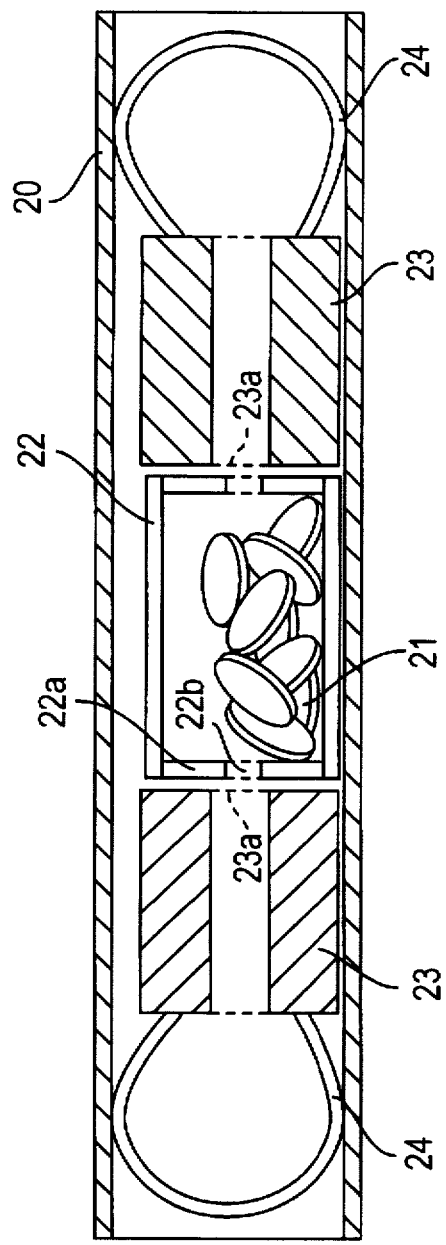
FIG. 2 is a sectional view of inside of a furnace core tube in embodiment (1).

FIG. 1 is a schematic diagram of a cylindrical heat resistant container in a lateral tubular furnace used for firing ceramic forms put in the container according to embodiment (1). FIG. 2 is a sectional view of the inside of the furnace core tube.

In FIG. 1, a furnace is composed of a temperature controller 10, a furnace body 11, a furnace core tube 12, a thermocouple 13, a furnace core tube support roller 14, a motor 15, a gear 16 for rotation of the furnace core tube 12, a fixture with an O-ring 17, and a metal lid with a rotary joint 18. In FIG. 2, the inside of the furnace core tube 12 comprises, a furnace core tube 20, ceramic forms 21, a cylindrical heat resistant container 22, a heat resistant lid 22a, vent holes 23a, and a positioning fitting 24.

The furnace body 11 of the lateral tubular furnace is fixed horizontally. The furnace core tube 12 is an aluminum tube of 70 mm in inner diameter and 1000 mm in length, and is designed to be rotated by the gear 16 coupled with the motor 15 mounted on the furnace core tube support roller 14. Ceramic forms 21 of $BaTiO_3$ derivative dielectric material, formed in disks of 2 mm in thickness and 10 mm or 5 mm in diameter, were charged into the cylindrical heat resistant container 22, made of high purity alumina of 50 mm in inner diameter and 300 mm in length, to an apparent volume percentage of 70%. The container 22 was covered with the heat resistant lid 22a and inserted into the center of the furnace core tube 12. Fire bricks 23 were put in from both ends of the furnace core tube 20, and fixed at the insertion portion by the positioning fittings 24. The heat resistant lid 22a and fire bricks 23 are provided with vent holes 22b, 23a. Air was sent in at a rate of 150 ml per minute from the rotary joint fitted to the metal lid 18, and was circulated in the cylindrical heat resistant container 22. The furnace temperature was raised to 500° C. at a rate of 50° C. per hour, and the temperature was held for 2 hours at 500° C. to burn out the binder in the ceramic forms. Then, the furnace temperature was raised to 1300° C. at a rate of 100° C. per hour, and held at 1300° C. for 2 hours. Next, the temperature was cooled to room temperature at a rate of 200° C. per hour. Upon reaching 1150° C. in the heating process, rotation of the furnace core tube 12 was started at a rate of one revolution per minute, and the rotation was stopped during the cooling process when the temperature declines to 800° C.

The rotating temperature range was set so as to include the maximum temperature to prevent the mutual sticking of the ceramic forms 21, after the mechanical strength of the ceramic forms 21 is increased.

Figure 10:
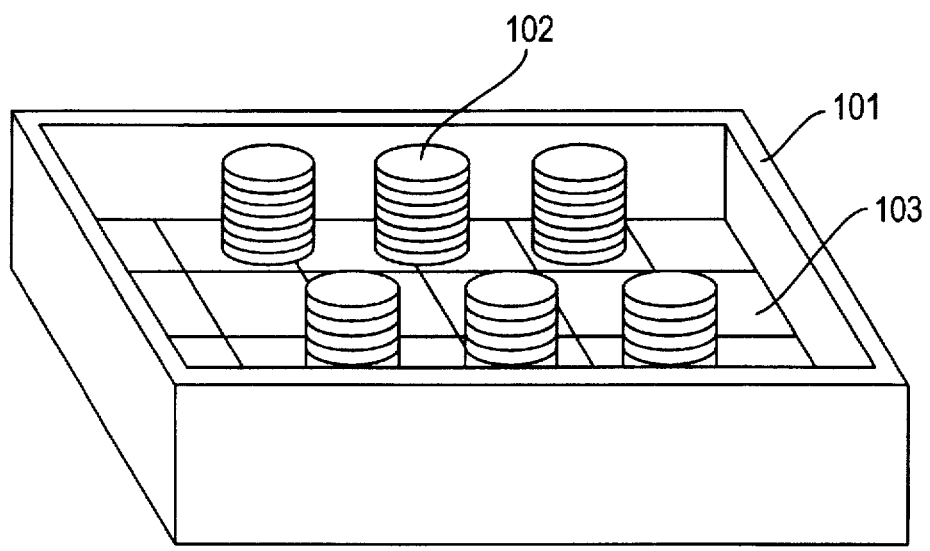
FIG. 10 is an appearance drawing of a saggar filled with ceramic forms in a conventional firing method.

Next, ceramic forms fired in accordance with the ceramics firing method of embodiment (1) of the present invention were compared with ceramics fired using a conventional box shaped electric furnace. Fifteen (15) sheets of ceramic forms 102 were sprinkled with powder and stacked up in the saggar 101 as shown in FIG. 10, and fired in the same temperature conditions.

Ceramics were fired according to embodiment (1) and ceramics were fired in the conventional boxed shaped electric furnace. The sticking defect, rate of bend, electrostatic capacity, and standard deviation were measured. The results of the ceramic forms 10 mm in diameter are shown in Table 1. The results of the ceramics 5 mm in diameter are shown in Table 2.

TABLE 1

| Firing method | Sticking defect rate | Rate of bend | Electrostatic capacity | Standard deviation |
|---|---|---|---|---|
| Embodiment (1) | 0% | 1 ~ 3% | 644 pF | 19 pF |
| Prior art | 60% | 21 ~ 35% | 641 pF | 62 pF |

TABLE 2

| Firing method | Sticking defect rate | Rate of bend | Electrostatic capacity | Standard deviation |
|---|---|---|---|---|
| Embodiment (1) | 0% | 1 ~ 2% | 119 pF | 3 pF |
| Prior art | 20% | 12 ~ 19% | 115 pF | 12 pF |

Herein, the sticking defect rate is the number of ceramics having two pieces of more stuck together in the total number of ceramics being fired, expressed in percentage. The rate of bend is calculated in the formula of $(t_2-t_i)\times 100/t_i$, where $t_i$ is the thickness of ceramics free from bend and t2 is the thickness of ceramics including bend.

It should be apparent from Table 1 and Table 2, that the firing method of embodiment 1 is notably effective for enhancing the uniformity of electrostatic characteristics, the suppression of sticking and the warp of the ceramics.

Figure 11:
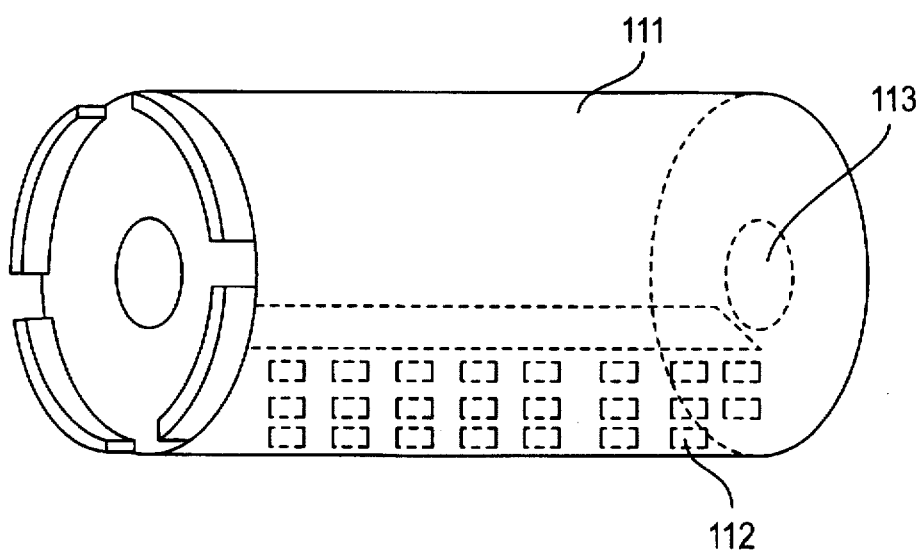
FIG. 11 is a perspective view of a capsule in a prior art disclosed in Japanese Laid-open Patent 61-101469.

As another comparative example, a capsule of 50 mm in inner diameter and 300 mm in length, in the same shape as the capsule 111 shown in FIG. 11, was filled with ceramic forms, which were the same as those used in embodiment (1), by an apparent volume percentage of 30%, and fixed in the center of the furnace core tube. The ceramic forms had a thickness is 2 mm and a diameter is 10 mm. The ceramic forms were fired using the same temperature conditions as in embodiment(1), while rotating continuously at a rate of one revolution per minute throughout the firing process, with the furnace core tube being kept horizontal. Cracks and cuts were formed in about half of ceramics, and the rate of bend was 7 to 15%. In the case of ceramic forms having a diameter of 5 mm, cracks and cuts were found in about 20% of the ceramics, and the rate of bend was 5 to 9%. In conclusion, as compared with the ceramics fired in accordance with embodiment (1), the ceramics fired using the prior art device depicted in FIG. 11 were defective in appearance and the shape precision was inferior.

Figure 12:
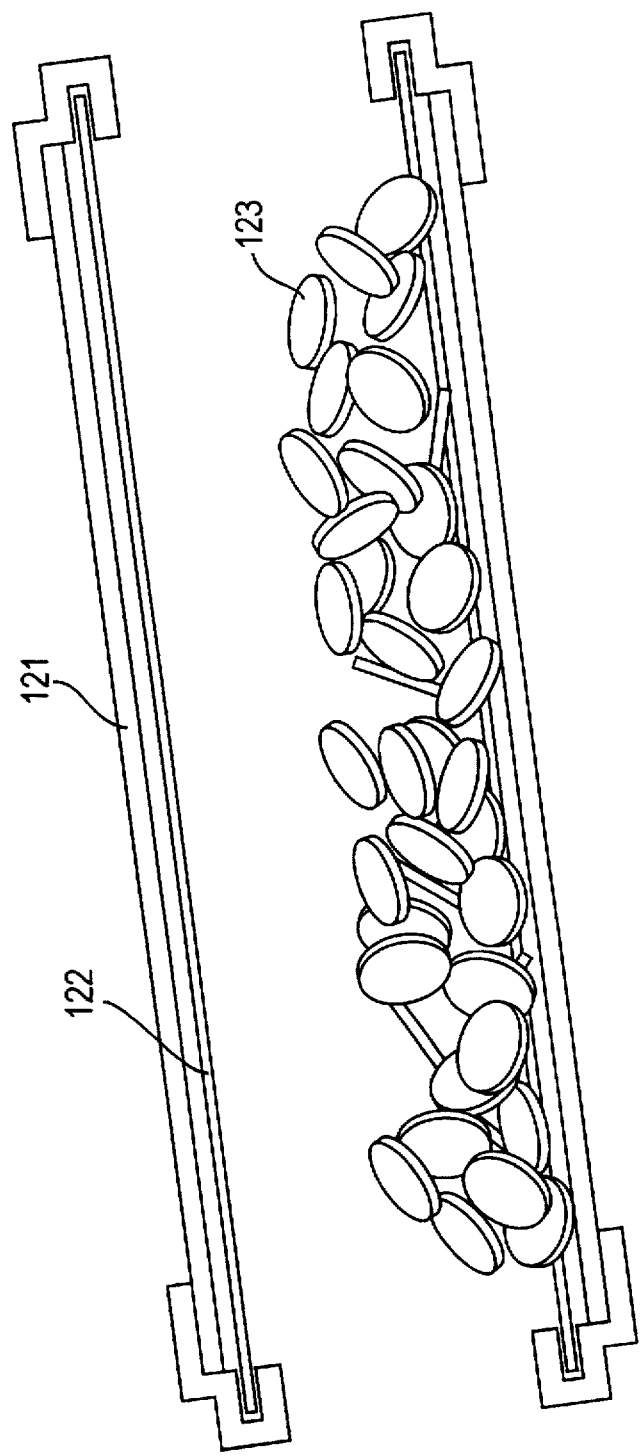
FIG. 12 is a schematic diagram of a furnace core tube in a prior art disclosed in Japanese Laid-open Patent 6-273051.

Further, using an inclined furnace core tube 121 having a bar 122 displaced from the axial center along the axis of rotation in the inner space of the furnace core tube 121 shown in FIG. 12, the temperature was preliminarily distributed as specified according to the same conditions employed in embodiment (1), and the furnace core tube 121 having an inner diameter of 50 mm was rotated continuously at a rate of one revolution per minute, the ceramic forms 123 were sent into the furnace core tube at an apparent volume percentage of 70%, and fired. In this comparative example, whether the diameter of ceramic forms was 10 mm or 5 mm, the fired ceramics were heavily broken. There were no ceramics of satisfactory shape that could be compared with embodiment (1).

Embodiment (2)

Embodiment (2) of the invention is described below. A cylindrical heat resistant container composed of an alumina tube of 30 mm in inner diameter and 200 mm in length and heat resistant lids at its both ends was filled with disk form ceramic forms having thickness of 2 mm and various diameters composed of $BaTiO_3$ derivative dielectric material to an apparent volume percentage of 70%, and the ceramic forms were fired using the same method and same firing conditions as described in embodiment (1) above.

Next, ceramic forms fired in accordance with the ceramics firing method in the same temperature conditions according to embodiment (2) of the present invention were compared with ceramics fired using a conventional box shaped electric furnace. Fifteen (15) sheets of ceramic forms 102 were sprinkled with powder and stacked up in the saggar 101 as shown in FIG. 10, and fired in the same temperature conditions (Comparative example 1).

Moreover, as comparative example 2, a capsule of 30 mm in inner diameter and 200 mm in length, in the same shape as the capsule 111 shown in FIG. 11, was filled with same ceramic forms as used in embodiment (2) by an apparent volume percentage of 30%, and fixed in the center of the furnace core tube. The ceramic forms were fired using the same temperature conditions as in embodiment (2), while rotating the capsule continuously at a rate of one revolution per minute throughout the firing process, with the furnace core tube kept horizontal.

See Table 3 for the sticking defect rate, cut defect rate, rate of bend, surface roughness, electrostatic capacity, and standard deviation for the ceramics fired according to embodiment (2), and the ceramics fired by the method of comparative example 1 and comparative example 2.

TABLE 3

| Firing method | Embodiment (2) | | | | | Comparative example 1 | | | | | Comparative example 2 | | | | |
|---|---|---|---|---|---|---|---|---|---|---|---|---|---|---|---|
| Ceramic for diameter (mm) | 25 | 20 | 10 | 7 | 5 | 25 | 20 | 10 | 7 | 5 | 25 | 20 | 10 | 7 | 5 |
| Sticking defect rate | 0 | 0 | 0 | 0 | 0 | 100 | 87 | 60 | 40 | 20 | 0 | 0 | 0 | 0 | 0 |
| Cut defect rate (%) | 0 | 0 | 0 | 0 | 0 | 0 | 0 | 0 | 0 | 0 | 100 | 98 | 53 | 248 | 1 |
| Rate of Bend (%) | 13~27 | 2~5 | 1~3 | 1~2 | 1~2 | 40~83 | 41~72 | 21~35 | 15~20 | 12~19 | — | 16~32 | 7~15 | 6~11 | 5'~9 |
| Surface | 2.1 | 1.9 | 2.3 | 1.8 | 1.5 | 1.5 | 1.5 | 1.3 | 1.4 | 1.5 | 3.8 | 3.3 | 2.9 | 3.1 | 2.7 |

TABLE 3-continued

| Firing method | Embodiment (2) | | | | | Comparative example 1 | | | | | Comparative example 2 | | | |
|---|---|---|---|---|---|---|---|---|---|---|---|---|---|---|
| roughness (μm) | | | | | | | | | | | | | | |
| Electrostatic capacity (pF) | 5260 | 3200 | 642 | 419 | 117 | 5251 | 3190 | 641 | 415 | 116 | — | 3203 | 639 | 425 | 118 |
| Standard deviation (pF) | 151 | 59 | 18 | 11 | 3 | 492 | 307 | 65 | 40 | 11 | — | 72 | 22 | 15 | 7 |

It should be apparent from Table 3, that the firing method of embodiment (2) presents notable advantages in suppressing sticking defects and warp of the ceramics and in enhancing the uniformity of electrostatic characteristics, as compared with comparative example 1, and as compared with comparative example 2. Moreover, the ceramics fired according to embodiment (2) were extremely improved as to the suppression of cut defects and the decrease of surface roughness. Incidentally, as the diameter of the ceramic forms increases, the rate of bend tends to increase. Specifically, in embodiment (2), when the inner diameter (30 mm) of the cylindrical heat resistant container was smaller than 1.5 times the diameter of ceramic forms, i.e., when the diameter of the ceramic forms was 25 mm, it was found that the rate of bend increased suddenly. It would appear that as the diameter of the ceramic forms increases, the rotation of such ceramic forms in the cylindrical heat resistant container becomes less smooth.

Hence, the inner diameter of the cylindrical heat resistant container is preferred to be about 1.5 times or more of the longest portion dimension of the ceramic forms.

Next, using the same method as in embodiment (2), disk form ceramic forms of 2 mm in thickness and 10 mm in diameter were charged in a cylindrical heat resistant container at different apparent volume percentages, and fired. The results of measurements of the sticking defect rate and rate of bend are shown in Table 4.

TABLE 4

| | | | | |
|---|---|---|---|---|
| Apparent volume percentage of ceramic forms (before firing) | 30 | 40 | 70 | 100 |
| Apparent volume percentage of ceramic forms (after firing) | 25 | 43 | 61 | 87 |
| Sticking defect rate (%) | 1 | 0 | 0 | 1 |
| Rate of bend (%) | 6 ~ 13 | 1 ~ 3 | 1 ~ 3 | 1 ~ 5 |

It should be apparent from Table 4, that when the apparent volume percentage before firing of ceramic forms in the cylindrical heat resistant container is smaller than 40%, it was found that the rate of bend of ceramics after firing is increased. When the apparent volume percentage is small, and if the cylindrical heat resistant container rotates, ceramic forms can hardly follow up the rotation. Further, the inversion of the plate surface of the disk form ceramic forms is not smooth, and stacking of ceramic forms becomes less. As a result, the correction of bend by weight is hardly advanced, which seems to be the cause of the increase in the rate of bend.

Hence, the apparent volume percentage is preferred to be 40% or more.

Embodiment (3)

Embodiment (3) is described below. Disk form ceramic forms composed of $BaTiO_3$ derivative dielectric material were calcined for 2 hours at 1100° C. Several types of disks of 1.85 mm in thickness and different in diameter were prepared, and charged in a cylindrical heat resistant container made of high purity alumina of 30 mm in inner diameter and 200 mm in length, at an apparent volume percentage of 70%. By inserting the container into a lateral tubular furnace same as in embodiment (1), the insertion position was fixed by fire bricks 23 and positioning fittings 24. In this embodiment (3), the metal lids with rotary joint 18 were not used. Both ends of the furnace core tube 12 are opened. By heating at a rate of 100° C. per hour and holding at 1300° C. for 2 hours. Then, it was cooled to room temperature at a rate of 200° C. per hour. Upon reaching 1100° C. in heating process, rotation of furnace core tube 12 was started at a rate of one revolution per minute. The rotation was stopped when the temperature declined to 800° C. in the cooling process.

Next, ceramic forms fired in accordance with the ceramics firing method of embodiment (3) of the present invention were compared with ceramics fired using a conventional box shaped electric furnace. Fifteen (15) sheets of ceramic forms 102 calcined for 2 hours at 1100° C. were sprinkled with powder and stacked up in the saggar 101, as shown in FIG. 10, and fired in the same temperature conditions (comparative example 1).

Moreover, as comparative example 2 with the ceramics firing method of the invention, a capsule of 30 mm in inner diameter and 200 mm in length, in the same shape as the capsule 111 shown in FIG. 11, was filled with same calcined disk form ceramic forms of various diameter as used in embodiment (3) by an apparent volume percentage of 30%, and fixed in the center of the furnace core tube. The ceramic forms were fired in the same temperature conditions as in embodiment (3), while rotating the capsule continuously at a rate of one revolution per minute throughout the firing process, with the furnace core tube kept horizontal.

See Table 5 for the sticking defect rate, cut defect rate, rate of bend, surface roughness, electrostatic capacity, and standard deviation for the ceramics by the method of comparative example 1 and comparative example 2, are shown in Table 5.

TABLE 5

| Firing method | Embodiment (3) | | | | Comparative example 1 | | | | Comparative example 2 | | | |
|---|---|---|---|---|---|---|---|---|---|---|---|---|
| Ceramic form diameter (mm) | 23 | 20 | 8.5 | 5.0 | 23 | 20 | 8.5 | 5.0 | 23 | 20 | 8.5 | 5.0 |
| Sticking defect rate (%) | 0 | 0 | 0 | 0 | 87 | 67 | 33 | 20 | 0 | 0 | 0 | 0 |
| Cut defect rate (%) | 0 | 0 | 0 | 0 | 0 | 0 | 0 | 0 | 13 | 8 | 3 | 2 |
| Rate of Bend (%) | 7~18 | 1~3 | 1~2 | <1 | 47~34 | 40~67 | 10~28 | 6~18 | 25~36 | 21~30 | 9~19 | 7~16 |
| Surface roughness (µm) | 1.9 | 1.8 | 1.9 | 1.4 | 1.4 | 1.3 | 1.3 | 1.2 | 2.9 | 2.6 | 2.7 | 2.3 |
| Electrostatic capacity (pF) | 5164 | 2806 | 721 | 135 | 5152 | 2815 | 712 | 125 | 5159 | 2800 | 709 | 131 |
| Standard deviation (pF) | 161 | 50 | 21 | 4 | 510 | 276 | 79 | 15 | 215 | 107 | 34 | 10 |

It should be apparent from Table 5, that the firing method of embodiment (3) presents notable advantages in suppressing sticking defects and warp of ceramics and in enhancing the uniformity of electrostatic characteristics, as compared with comparative example 1, and as compared with comparative example 2. Moreover, the ceramics fired according to embodiment (3) were extremely improved as to suppression of cut defects and the decrease of surface roughness. Incidentally, as the diameter of calcined ceramic forms increases, the rate of bend tends to increase. Specifically, in embodiment (3), when the inner diameter (30 mm) of the cylindrical heat resistant container was smaller than 1.5 times the diameter of calcined ceramic forms, i.e., when the diameter of the ceramic forms was 23 mm, it was found that the rate of bend increased suddenly. It appears that as the diameter of the calcined ceramic forms increases, the rotation of such ceramic forms in the cylindrical heat resistant container becomes less smooth.

Hence, the inner diameter of the cylindrical heat resistant container is preferred to be 1.5 times or more of the longest portion dimension of the ceramic forms, regardless of the shape of the ceramic forms.

Next, using the same method as in embodiment (3), calcined disk form ceramic forms of 1.85 mm in thickness and 8.5 mm in diameter were charged in a cylindrical heat resistant container at different apparent volume percentages, and fired. The results of measurements of the sticking defect rate and rate of bend are shown in Table 6.

TABLE 6

| Apparent volume percentage of ceramic forms (before firing) | 30 | 40 | 70 | 95 | 100 |
|---|---|---|---|---|---|
| Apparent volume percentage of ceramic forms (after firing) | 28 | 47 | 66 | 90 | 95 |
| Sticking defect rate (%) | 1 | 0 | 0 | 3 | 17 |
| Rate of bend (%) | 6~11 | 0~3 | 1~2 | 1~4 | 8~15 |

It should be apparent from Table 6, that when the apparent volume percentage before firing of calcined ceramic forms in the cylindrical heat resistant container is smaller than 40%, it was found that the rate of bend of ceramics after firing is increased. When the apparent volume percentage is small, and if the cylindrical heat resistant container rotates, ceramic forms can hardly follow up the rotation. Further, the inversion of the plate surface of the disk form ceramic forms is not smooth, and stacking of the ceramic forms becomes less. As a result, the correction of bend by weight is hardly advanced, which seems to be the cause of the increase in the rate of bend.

On the other hand, when the apparent volume percentage of ceramics after firing in the cylindrical heat resistant container exceeds 90%, the sticking defect rate and the rate of bend increase suddenly. This is brought about because the ceramic forms, charged in the container at excessive apparent volume percentage, can hardly move when the cylindrical heat resistant container rotates. As a result, the ceramic forms are fired without sufficient effects of stirring and impact.

Hence, the ceramic forms are preferred to be charged in the cylindrical heat resistant container at an apparent volume percentage before firing of 40% or more, and an apparent volume percentage after firing of 90% or less.

Embodiment (4)

Embodiment (4) is described below, while referring to the FIG. 3. This figure is a sectional view of a furnace core tube used for firing ceramic forms placed directly therein. The furnace core tube coating unit is part of a lateral tubular furnace.

Figure 3:
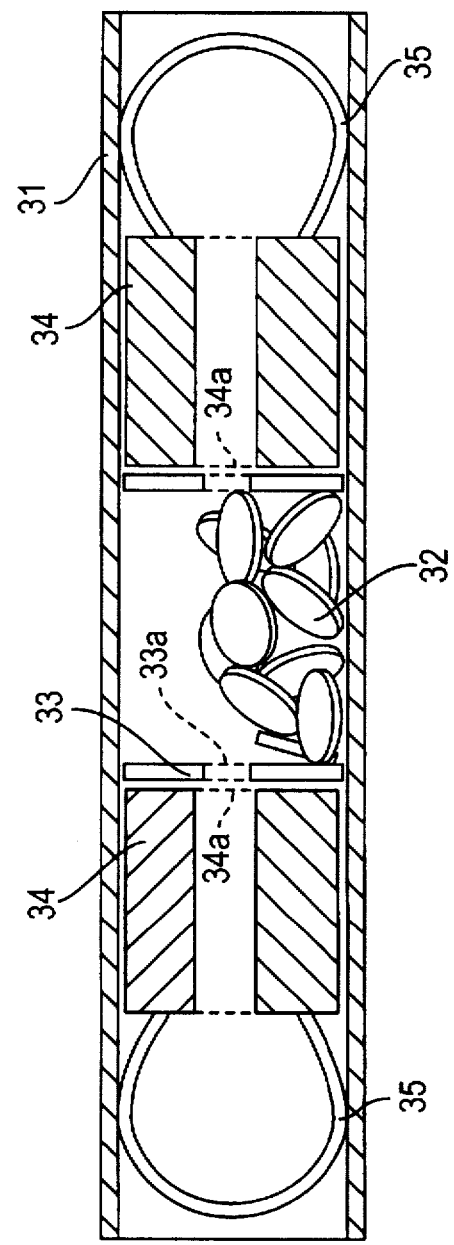
FIG. 3 is a sectional view of inside of a furnace core tube in embodiment (4).

In FIG. 3, the furnace comprises, a furnace core tube 31, ceramic forms 32, a heat resistant lid 33, a vent hole 33a, fire bricks 34, a vent hole 34a, and positioning fittings 35.

The portion of the furnace core tube 31 shown in FIG. 3 is made of high purity alumina tube having a 50 mm in inner diameter and 1000 mm in length. The central portion is 300 mm in length. Ceramic forms 32 of ZnO varistor material, formed in discs of 12 mm in diameter and various thicknesses were charged to an apparent volume percentage of 80% in the central portion. The core tube was installed in the same lateral tubular furnace used in embodiment (1), and fire bricks 34 adhering to the heat resistant lid 33 were put in from both ends of the furnace core tube 31. The insertion position was fixed by the positioning fittings 35. The heat resistant lid 33 and fire bricks 34 are provided with vent holes 33a and 34a. Air was sent in at a rate of 150 ml per minute and circulated in the furnace core tube 31. The furnace temperature was raised to 500° C. at a rate of 50° C. per hour, and the temperature was held for 2 hours at 500° C. to burn out the binder in the ceramic forms. Then, the furnace temperature was further raised to 1250° C. at a rate of 100° C. per hour, and held at 1250° C. for 2 hours. Next, the temperature was cooled to room temperature at a rate of 200° C. per hour. Upon reaching 800° C. in the heating process, rotation of the furnace core tube was started at a rate of a half revolution per minute, and the rotation was stopped when the temperature declined to 600° C. in the cooling process.

Next, ceramic forms fired in accordance with the ceramics firing method of embodiment (4) of the present invention were compared with ceramics fired using a conventional box shaped electric furnace. Fifteen (15) sheets of ceramic forms 102 were sprinkled with powder and stacked up in the saggar 101 as shown in FIG. 10, and fired using the same temperature conditions.

Moreover, as comparative example 2 with the ceramics firing method of the invention, a capsule of 50 mm in inner diameter and 300 mm in length in the same shape as the capsule 111 shown in FIG. 11 was filled with same disk form ceramic forms of different diameters as used in embodiment (4) by an apparent volume percentage of 30%, and fixed in the center of the furnace core tube. The ceramic forms were fired using the same temperature conditions as used in embodiment (4), while rotating the capsule continuously at a rate of half revolution per minute throughout the firing process, with the furnace core tube kept horizontal.

See Table 7 for the sticking defect rate, cut defect rate, rate of bend, surface roughness, varistor voltage ($V_{1mA/mm}$), and standard deviation ($\sigma V_{1mA}$) for the ceramics fired in accordance with embodiment (4), and the ceramics fired in accordance with comparative example 1 and comparative example 2.

In comparative example 1, comprising ZnO varistor material, when 1 mm thick ceramic forms were fabricated without adding $Bi_2O_3$, embodiment (4) has the sticking defect rate dropped to 5% or less, and the rate of bend dropped to 2% or less as compared with comparative example 1. As for ZnO varistor material, it is known that a liquid phase mainly composed of $Bi_2O_3$ is generated in the firing process and splashes at high temperature. However, without the addition of $Bi_2O_3$, such a liquid phase is not generated and hence, does not splash. As a result, sticking and bending are suppressed. Therefore, the firing method of the present invention provides a very effective method for suppressing defective appearances, especially in the case of firing ceramic forms that generate a liquid phase in the firing process and cause splashes.

Next, a comparative example 3 was tried in accordance with the firing method depicted in FIG. 12. An inclined tubular furnace was used in which a bar 122 was displaced from the axial center disposed along the axis of rotation in the internal space of the furnace core tube 121, shown in FIG. 12. The temperature was distributed in accordance with the same temperature conditions as in embodiment (4). The ceramic forms 123 were the same as those used in the

TABLE 7

| Firing method | Embodiment (4) | | | | Comparative example 1 | | | | Comparative example 2 | | | |
|---|---|---|---|---|---|---|---|---|---|---|---|---|
| Ceramic form thickness (mm) | 1 | 2 | 4 | 6 | 1 | 2 | 4 | 6 | 1 | 2 | 4 | 6 |
| Sticking defect rate (%) | 0 | 0 | 0 | 0 | 93 | 80 | 33 | 20 | 0 | 0 | 0 | 0 |
| Cut defect rate (%) | 2 | 1 | 0 | 0 | 0 | 0 | 0 | 0 | 95 | 86 | 78 | 85 |
| Rate of Bend (%) | 1~5 | 1~2 | <1 | <1 | 111~182 | 43~71 | 9~22 | 2~5 | 19~42 | 9~30 | 5~13 | 1~2 |
| Surface roughness (μm) | 5.1 | 4.4 | 4.6 | 4.9 | 3.8 | 3.1 | 3.5 | 3.6 | 27 | 28 | 31 | 24 |
| Varistor voltage (V) | 83 | 85 | 87 | 86 | 85 | 87 | 84 | 84 | 82 | 84 | 87 | 85 |
| Standard deviation (V) | 0.6 | 0.7 | 0.5 | 0.5 | 2.7 | 2.7 | 2.5 | 2.1 | 1.3 | 1.0 | 1.1 | 0.9 |

It should be apparent from Table 7, that the firing method of the embodiment presents notable advantages in suppressing of sticking defects and warp of ceramics and in enhancing the uniformity of the electrostatic characteristics, as compared with comparative example 1, and as compared with comparative example 2. Moreover, the ceramics according to embodiment (4) were extremely improved as to the suppression of cut defects and the decrease of surface roughness. In any firing method, the rate of bend tends to increase as the thickness of the ceramic forms becomes thinner. However, in the case where the value of the ratio of the diameter to thickness of disk form ceramic forms is 3 or more, i.e., in the case of a thickness of 4 mm or less, according to the firing method of embodiment (4), as compared with comparative example 1 or comparative example 2, the rate of bend is extremely suppressed. Hence, the firing method of the invention is confirmed to be a method exhibiting an extremely excellent advantage on thin plate form ceramics.

In the case of ceramic forms having a thickness of 1 mm and 2 mm in embodiment (4), the cut defect rate was confirmed to be 0% when the ceramic forms were preliminarily calcined at 800° C. and charged into the cylindrical heat resistant container. Therefore, the occurrence of cut defect seems to be caused by defects formed on the ceramic forms due to impact at the time of filling the cylindrical heat resistant container with ceramics.

embodiment (4), the ceramic forms were fired in the furnace core tube 121 at an apparent volume percentage of 70% and the furnace core tube 121 of 50 mm in inner diameter was rotated continuously at a rate of half revolution per minute. In this comparative example 2, when ceramic forms having a thickness of 4 mm or less were used, the fired ceramics were extremely broken, and no ceramics having a satisfactory shape were obtained that could be compared with the embodiment (4).

Embodiment (5)

Embodiment 5 is described below. Using a $BaTiO_3$ derivative dielectric material, square columnar ceramic forms, 3.8 mm square at both ends and different in height were fabricated. Then, in the same manner as in embodiment (4), the square columnar ceramic forms were inserted into the 300 mm-central portion of the furnace core tube, which was made of high purity alumina having an inner diameter of 50 mm in and a length of 1000 mm, at an apparent volume percentage of 80%. The square columnar ceramic forms were fired in the lateral tubular furnace. The furnace temperature was raised to 500° C. at a rate of 500° C. per hour while air was circulated in the furnace tube core at a rate of 150 ml per minute. The furnace temperature was held for 2 hours at 500° C. to burn out the binder in the forms. Next, the furnace temperature was further raised to 1350° C. at a rate of 200° C. per hour, and held at 1350° C. for 2 hours. Then, the furnace was cooled to room temperature at a rate of 200° C. per hour. Upon reaching 1150° C. in the heating process, rotation of the furnace core tube was started and continued at a rate of two revolutions per minute. The rotation was stopped when the furnace temperature declined to 1000° C. during the cooling process.

Figure 13:
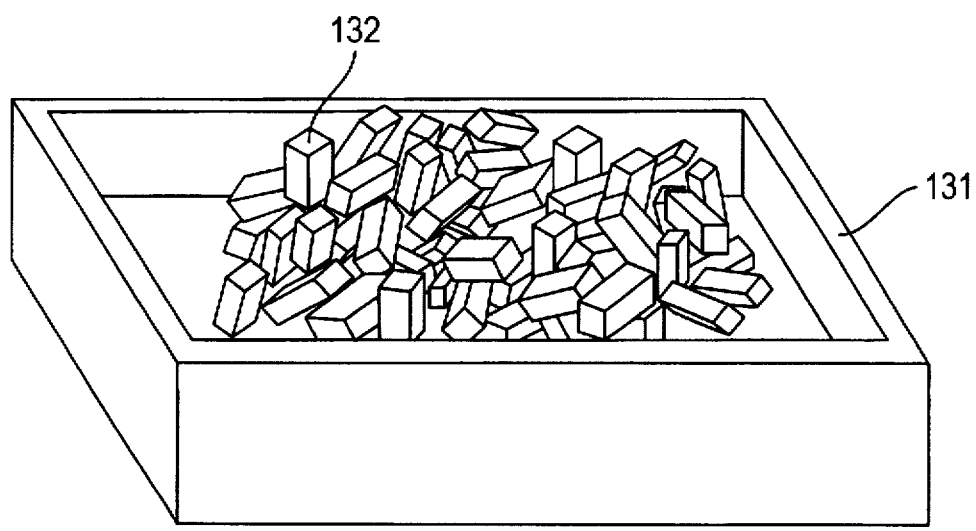
FIG. 13 is a n appearance dr awing of a saggar filled with ceramic forms in a conventional firing method.

Next, ceramic forms fired in accordance with the ceramics firing method of embodiment (5) of the present invention were compared with ceramics fired using a conventional box shaped electric furnace. Ceramic forms 132 were sprinkled with powder and stacked up in bulk in a saggar 131 as shown in FIG. 13, and fired in the same temperature conditions (comparative example 1).

Moreover, as comparative example 2, a capsule of 50 mm in inner diameter and 300 mm in length, in the same shape as the capsule 111 shown in FIG. 11 was filled with the same square columnar ceramic forms of different heights as used in embodiment (5) by an apparent volume percentage of 30%, and fixed in the center of the furnace core tube. The square columnar ceramic forms were fired using the same temperature conditions as in the embodiment (5), while rotating the capsule continuously at a rate of two revolutions per minute throughout the firing process, with the furnace core tube kept horizontal.

See Table 8 for the sticking defect rate, cut defect rate, and bend in height direction for the ceramics fired according to embodiment (5), and the ceramics fired by the method of comparative example 1 and comparative example 2.

to comparative example 1. It is known that $Bi_2O_3$ is fused during the firing process to form liquid phase, and that it splashes at high temperature. However, when $Bi_2O_3$ is not added, a liquid phase is not generated, and components do not splash. By not adding $Bi_2O_3$, sticking and bending are suppressed. Therefore, the firing method of the present invention presents a particularly notable advantage for suppressing defective appearances in the case of firing ceramic forms that generate liquid phase and cause splashes during the firing process.

Next, a comparative example 3 was tried in accordance with the firing method depicted in FIG. 12. An inclined tubular furnace in which a bar 122 displaced from the axial center was disposed along the axis of rotation in the internal space of the furnace core tube 121, shown in FIG. 12. The temperature was distributed in the same manner as specified for embodiment (5). The ceramic forms 123, which were the same size as those used in embodiment (5), were fired in the furnace core tube 121 at an apparent volume percentage of 70%, while continuously rotating a furnace core tube 121 of 50 mm in inner diameter at a rate of two revolutions per minute. In this comparative example 3, however, the fired ceramics were extremely broken. No ceramics having satisfactory shape were obtained that could be compared with the embodiment (5).

Embodiment (6)

Embodiment 6 of the invention is described below. Square plate ceramic forms composed of (Pb, La)TiO$_3$ derivative piezoelectric material were calcined for 2 hours at 1050° C.

TABLE 8

| Firing method | Embodiment (5) | | | | | Comparative example 1 | | | | | Comparative example 2 | | | | |
|---|---|---|---|---|---|---|---|---|---|---|---|---|---|---|---|
| Ceramic form thickness (mm)0 | 5 | 6.5 | 7 | 8 | 9 | 5 | 6.5 | 7 | 8 | 9 | 5 | 6.5 | 7 | 8 | 9 |
| Sticking defect rate (%) | 0 | 0 | 0 | 0 | 0 | 42 | 47 | 61 | 59 | 65 | 0 | 0 | 0 | 0 | 0 |
| Cut defect rate (%) | 0 | 0 | 0 | 0 | 0 | 0 | 0 | 0 | 0 | 0 | 83 | 89 | 95 | 92 | 95 |
| Bend in height direction (μm) | 3~17 | 5~20 | 5~24 | 7~30 | 12~39 | 11~53 | 13~62 | 21~95 | 20~116 | 27~145 | 7~25 | 9~28 | 18~49 | 21~68 | 22~79 |

It should be apparent from Table 8, that the firing method of embodiment (5) presents notable advantages in suppressing sticking defects and bending of ceramics, as compared with comparative example 1, and as compared with comparative example 2. Moreover, the ceramics fired according to embodiment (5) were extremely improved as to the suppression of cut defects. Incidently, as the height of the square columnar ceramic forms becomes higher, the bend increases. However, when the value of the ratio of the diagonal length of the square at both ends to the height of the square is ¾ or less, i.e., when the height of square columnar ceramic forms is 7 mm or more, then the difference of bend is more apparent using the firing method of embodiment (5), than in using the firing method of comparative example 1, or comparative example 2. Therefore, the firing method of the present invention is found to provide an excellent advantage by enhancing the shape and precision of high square columnar ceramics.

In embodiment (5), $Bi_2O_3$ was added to the $BaTiO_3$ derivative dielectric material. However, in comparative example 1, $Bi_2O_3$ was not added. Then, when 9 mm thick ceramic forms were fabricated, embodiment (5) has the sticking defect rate decreased to 5% or less, and the maximum value of bend decreased to 50 μm or less as compared The square plate ceramic form s were rectangular in the form of 6 mm×8 mm on both plate sides, and having different thicknesses. These calcined square plate ceramic forms were fired in accordance with the same method as in embodiment (3). However, the maximum holding temperature was 1250° C., rather than 1300° C.

Next, ceramic forms fired in accordance with the ceramics firing method of embodiment (6) of the present invention were compared with ceramics fired using a conventional box shaped electric furnace. Square plate ceramic forms 102 were calcined for 2 hours at 1050° C., sprinkled with powder, and stacked up in 5 to 15 layers in a saggar 101, as shown in FIG. 10, and fired in the same temperature conditions (comparative example 1). Moreover, as A As comparative example 2, a capsule of 30 mm in inner diameter and 200 mm in length, in the same shape as the capsule 111 shown in FIG. 11, was filled with several types of square plate ceramic forms of different thicknesses of the same type as used in embodiment (6) by an apparent volume percentage of 30%, and fixed in the center of the furnace core tube. The square plate ceramic forms were fired under the same temperature conditions as in embodiment (6), while rotating the capsule continuously at a rate of one revolution per minute throughout the firing process, with the furnace core tube kept horizontal.

See Table 9 for the sticking defect rate, cut defect rate, rate of bend, surface roughness, electrostatic capacity, and standard deviation for the ceramics fired according to embodiment (6), and the ceramics fired by the method of comparative example 1 and comparative example 2.

Embodiment (7)

Embodiment (7) of the invention is described below. Circular columnar ceramic forms, composed of $Pb(Zr, Ti)O_3$ derivative piezoelectric material, were calcined for 2 hours at 1000° C. The ceramic forms use in embodiment (7)

TABLE 9

| Firing method | Embodiment (6) | | | | Comparative example 1 | | | | Comparative example 2 | | | |
|---|---|---|---|---|---|---|---|---|---|---|---|---|
| Ceramic form thickness (mm) | 1 | 2 | 3.3 | 5 | 1 | 2 | 3.3 | 5 | 1 | 2 | 3.3 | 5 |
| Sticking defect rate (%) | 0 | 0 | 0 | 0 | 95 | 81 | 67 | 33 | 0 | 0 | 0 | 0 |
| Cut defect rate (%) | 0 | 0 | 0 | 0 | 95 | 81 | 67 | 33 | 0 | 0 | 0 | 0 |
| Rate of bend (%) | 3~7 | 2~4 | 1~2 | 1~2 | 72~111 | 50~81 | 23~42 | 11~17 | 34~55 | 21~38 | 12~22 | 5~9 |
| Surface roughness (μm) | 1.3 | 1.5 | 1.4 | 1.2 | 1.1 | 1.2 | 0.8 | 1.0 | 2.2 | 2.5 | 2.3 | 1.9 |
| Electrostatic capacity (pF) | 35.6 | 18.0 | 18.0 | 7.2 | 34.0 | 17.0 | 10.2 | 6.4 | 36.6 | 17.9 | 10.5 | 7.4 |
| Standard deviation (pF) | 21.0 | 0.5 | 0.3 | 0.2 | 3.1 | 1.6 | 1.1 | 0.7 | 1.6 | 1.0 | 0.7 | 0.4 |

It should be apparent from Table 9, that the firing method of embodiment (6) presents notable advantages in suppressing the sticking defect, cut and bend of ceramics and in improving the uniformity of electric characteristics, as compared with comparative examples 1 and 2, and as compared with comparative example 2. Moreover, the surface roughness was extremely improved over comparative example 2. Incidentally, in any firing method, as the thickness of the calcined ceramic forms becomes thinner, the rate of bend tends to increase. However, when the value of the ratio of diagonal line of the square plate forms to the thickness of calcined square plate ceramic forms is 3 or more, i.e., when the thickness is 3.3 mm or less, using the firing method of embodiment (6), the rate of bend is extremely suppressed as compared with comparative example 1 or comparative example 2. Therefore, the firing method of the present invention is found to exhibit an excellent advantage with respect to thin plate ceramics, in particular.

A comparative example 3 was tried using the firing method of embodiment (6), and using an inclined tubular furnace in which a bar 122 was displaced from the axial center that was disposed along the axis of rotation in the internal space of the furnace core tube 121, as shown in FIG. 12. The temperature was distributed according to the same temperature conditions specified for embodiment (6), and the same type of calcined ceramic forms 123 as used in the embodiment (6) were fired in the furnace core tube 121 at an apparent volume percentage of 70%, while continuously rotating the furnace core tube 121 of 30 mm in inner diameter at a rate of half revolution per minute. In this comparative example 3, however, the fired ceramics were extremely broken regardless of the thickness of the calcined ceramic forms. As a result, no ceramics having a satisfactory shape were obtained that could be compared with embodiment (6).

comprised several types of circular columnar ceramic forms having a circle diameter of 4.2 mm at both ends. The height of the forms varied. These calcined circular columnar ceramic forms were fired using the same method as specified for embodiment (3). However, the maximum holding temperature was 1200° C., and the rotation starting temperature was 900° C.

Next, ceramic forms fired in accordance with the ceramics firing method of embodiment (6) of the present invention were compared with ceramics fired using a conventional box shaped electric furnace (comparative example 1). Ceramic forms 132 calcined for 2 hours at 1000° C. were sprinkled with powder and stacked up in bulk in a saggar 131 as shown in FIG. 13, and fired in the same temperature conditions.

Moreover, as comparative example 2, a capsule of 30 mm in inner diameter and 200 mm in length, in the same shape as the capsule 111 shown in FIG. 11, was filled with several types of circular columnar ceramic forms of different heights that were the same as those used in embodiment (6) by an apparent volume percentage of 30%, and fixed in the center of the furnace core tube. The circular columnar ceramic forms were fired under the same temperature conditions as specified for embodiment (6), while rotating the capsule continuously at a rate of one revolution per minute throughout the firing process, with the furnace core tube kept horizontal.

See Table 10 for the sticking defect rate, cut defect rate, rate of bend, and the bend in height direction for the ceramics fired according to embodiment (7), and the ceramics fired by the method of comparative example 1 and comparative example 2.

TABLE 10

| Firing method | Embodiment (7) | | | | Comparative example 1 | | | | Comparative example 2 | | | |
|---|---|---|---|---|---|---|---|---|---|---|---|---|
| Ceramic form height (mm) | 4.2 | 5.6 | 6.3 | 8.4 | 4.2 | 5.6 | 6.3 | 8.4 | 4.2 | 5.6 | 6.3 | 8.4 |
| Sticking defect rate (%) | 0 | 0 | 0 | 0 | 22 | 24 | 27 | 32 | 0 | 0 | 0 | 0 |
| Cut | 0 | 1 | 0 | 0 | 0 | 0 | 0 | 0 | 4 | 6 | 11 | 17 |

TABLE 10-continued

| Firing method | Embodiment (7) | | | | Comparative example 1 | | | | Comparative example 2 | | | |
|---|---|---|---|---|---|---|---|---|---|---|---|---|
| defect rate (%) | | | | | | | | | | | | |
| Bend in height direction (μm) | 0–15 | 3–19 | 5–26 | 10–40 | 2–21 | 12–54 | 25–79 | 27–98 | 0–23 | 11–38 | 21–50 | 20–65 |

It should be apparent from Table 10, the firing method of embodiment (7) presents notable advantages in suppressing the sticking defects, cuts and bends of ceramics as compared with comparative examples 1 and 2. Incidentally, as the height of the calcined circular columnar ceramic forms becomes higher, the amount of bend increases. However, when the value of the ratio of height to the diameter of circle at both ends is ¾ or less, i.e., when the height of the calcined circular columnar ceramics is 5.6 mm or more, using the firing method of embodiment (7), the difference in the amount of bend is much better as compared with comparative example 1 or with comparative example 2. Therefore, the firing method of the invention is found to exhibit an excellent advantage in enhancing the shape and precision of tall circular columnar ceramics, in particular.

A comparative example 3 was tried using the firing method of embodiment (7), and using an inclined tubular furnace in which a bar 122 displaced from the axial center was disposed along the axis of rotation in the internal space of a furnace core tube 121, as shown in FIG. 12. The temperature was distributed in accordance with the same temperature conditions specified for embodiment (7), and the calcined circular columnar ceramic forms 123 were the same type as those specified for embodiment (7). These calcined circular columnar ceramic forms were fired in the furnace core tube 121 at an apparent volume percentage of 70%, while continuously rotating the furnace core tube 121 of 50 mm in inner diameter at a rate of one revolution per minute. In this comparative example 3, however, the fired ceramics were extremely broken. As a result, no ceramics having satisfactory shape were obtained that could be compared with embodiment (7).

Embodiment (8)

Embodiment (8) is described below. A cylindrical heat resistant container comprising a tube made of high purity alumina, 30 mm in inner diameter and 200 mm in length, and having lids at both of its ends, was filled with rectangular plate ceramic forms of BaTiO₃ derivative dielectric material, 4 mm in on the shorter side, and 5 mm in on the longer side, and 0.9 mm in thickness, to an apparent volume percentage of 90% The plate ceramic forms were fired using the same method and the same firing conditions as specified for embodiment (1), but using different rotating speeds for the furnace core tube.

Table 11 shows the sticking defect rates, cut defect rates, amount of bend, and surface roughness of the various ceramics used in embodiment (8) for different rotating speeds of the furnace core tube.

TABLE 11

| Rotating speed (rpm) | 0.005 | 0.01 | 0.1 | 0.5 | 1 | 2 | 10 | 20 |
|---|---|---|---|---|---|---|---|---|
| Sticking defect rate (%) | 5 | 1 | 0 | 0 | 0 | 0 | 0 | 0 |
| Cut defect rate (%) | 0 | 0 | 0 | 0 | 0 | 0 | 1 | 7 |
| Bend in longitudinal direction (μm) | 12–47 | 7–13 | 5–10 | 2–8 | 1–9 | 2–8 | 1–10 | 0–9 |
| Surface roughness (μm) | 1.3 | 1.2 | 1.1 | 1.3 | 1.3 | 1.5 | 2.5 | 2.9 |

It should be apparent from Table 11, that when the rotating speed of the furnace core tube is slower than 0.01 rpm, the sticking defect rate and bend amount increase, and when the speed is faster than 10 rpm, the cut defect rate and surface roughness increase. Therefore, a, preferred rotating speed was confirmed to be 0.01 rpm to 10 rpm.

Embodiment (9)

Embodiment (9) is described below. Circular columnar ceramic forms made of Zno derivative varistor material were calcined for 2 hours at 750° C. The circular columnar ceramics forms were 21 mm in diameter and 1.1 mm in thickness. The calcined circular columnar ceramics forms were charged in a cylindrical heat resistant container comprising a high purity alumina tube, 50 mm in inner diameter and 300 mm in length, and with lids at both ends, to an apparent volume percentage of 80%, and fired under the same conditions specified for embodiment (3), for 2 hours at 1200° C. at a heating rate of 100° C. per hour. Upon reaching 900° C. in the heating process, rotation of the furnace core tube was started. The rotation was stopped when the temperature declined to 600° C. in the cooling process.

Table 12 shows the sticking defect rates, cut defect rates, rates of bend, and surface roughness obtained at different rotating speeds.

TABLE 12

| Rotating speed (rpm) | 0.005 | 0.01 | 0.1 | 0.5 | 1 | 2 | 10 | 20 |
|---|---|---|---|---|---|---|---|---|
| Sticking defect rate (%) | 4 | 1 | 0 | 0 | 0 | 0 | 0 | 0 |
| Cut defect rate (%) | 0 | 0 | 0 | 0 | 0 | 0 | 1 | 6 |
| Rate of bend (%) | 11–43 | 2–10 | 1–6 | 0–5 | 0–6 | 1–5 | 0–4 | 0–5 |
| Surface roughness (μm) | 3.9 | 4.2 | 4.3 | 4.6 | 5.1 | 5.5 | 15 | 24 |

It should be apparent from Table 12, that when the rotating speed of the furnace core tube is slower than 0.01 rpm, the sticking defect rate and bend amount increase, and that when the rotating speed is faster than 10 rpm, the cut defect rate and surface roughness increase. Therefore, a preferred rotating speed was confirmed to be 0.01 rpm to 10 rpm. In this embodiment (9), incidentally, if the ceramic forms were fired without being calcined, cut defects occurred in 1 to 2% of the forms, even at the rotating speed of 2 rpm or less. This was considered because ceramic forms are broken by the impact when packing the ceramic forms into the cylindrical heat resistant container. However, it should be apparent that after once calcining and packing the ceramic forms into the cylindrical heat resistant container, the cut defects are greatly reduced, as compared with the method without calcining. As a result, calcining prior to firing provides an excellent advantage in suppressing cut defects.

Embodiment (10)

Embodiment (10) is described below. In embodiment (10), a cylindrical heat resistant container comprising a high purity alumina tube, 30 mm in inner diameter and 100 mm in length and lids at both ends was used. Rectangular plate ceramic forms of 4 mm in on the shorter side, 5 mm in on the longer side, and 0.9 mm in thickness, made of $BaTiO_3$ derivative dielectric material, were charged to an apparent volume percentage of 100%. These plate ceramic forms were fired in the same manner and under the same firing conditions as specified for embodiment (1), while rotating the furnace core tube in various conditions, e.g., intermittently or continuously.

Table 13 shows the sticking defect rates, cut defect rates, amounts of bend, surface roughness, electrostatic capacity and its standard deviation of the plate ceramic forms rotated under various rotating conditions of a furnace core tube.

TABLE 13

| Rotating condition | Continuous rotation 0.5 rpm | Intermittent rotation | | Continuous rotation 1 rpm | Intermittent rotation | | Continuous rotation 2 rpm | Intermittent rotation |
| | | 1 rpm 10 sec. stop 10 sec | 2 rpm 5 sec. stop 15 sec | | 2 rpm 10 sec. stop 10 sec | 4 rpm 10 sec. stop 30 sec | | 4 rpm 20 sec. stop 20 sec |
|---|---|---|---|---|---|---|---|---|
| Sticking defect rate (%) | 0 | 0 | 0 | 0 | 0 | 0 | 0 | 0 |
| Bend in longitudinal direction (μm) | 1–8 | 0–6 | 0–4 | 1–9 | 0–5 | 0–4 | 2–8 | 0–5 |
| Standard deviation of bend (μm) | 6.1 | 3.9 | 4.2 | 6.8 | 2.5 | 2.9 | 6.0 | 2.7 |
| Surface roughness (μm) | 1.3 | 1.2 | 1.1 | 1.3 | 1.1 | 1.1 | 1.5 | 1.1 |
| Electrostatic capacity (pF) | 10.0 | 9.8 | 9.6 | 10.1 | 10.3 | 9.9 | 10.3 | 9.8 |
| Standard deviation (pF) | 0.31 | 0.22 | 0.19 | 0.32 | 0.24 | 0.16 | 0.30 | 0.18 |

It should be apparent from Table 13, that if the rotating speed per unit time is same, the bend is suppressed in intermittent rotation as compared with continuous rotation, and that the uniformity of dielectric constant is improved, that the surface roughness is smaller, and that the stick defect is not increased.

Embodiment (11)

Embodiment 11 is described below. Disk form ceramic forms, made of ZnO derivative varistor material, were calcined for 2 hours at 750° C. The disk form ceramics forms were 21 mm in diameter and 1.1 mm in thickness. The calcined disk form ceramics forms were charged in a cylindrical heat resistant container, comprising a high purity alumina tube, having a 50 mm in inner diameter, 300 mm in length, and lids at both ends, to an apparent volume percentage of 100%, and fired in the same manner specified for embodiment (3) for 2 hours at 1200° C., at a heating rate of 100° C. per hour. Upon reaching 900° C. in the heating process, rotation of the furnace core tube was started. The rotation was stopped when the temperature declined to 600° C. in the cooling process.

Table 14 shows the sticking defect rates, rates of bend, surface roughness, varistor voltages, and its standard deviation foe the ceramics rotated in the furnace core tube intermittently or continuously under various conditions.

TABLE 14

| Rotating condition | Continuous rotation 0.5 rpm | Intermittent rotation | | Continuous rotation 1 rpm | Intermittent rotation | | Continuous rotation 2 rpm | Intermittent rotation |
|---|---|---|---|---|---|---|---|---|
| | | 1 rpm 10 sec. stop 10 sec | 2 rpm 5 sec. stop 15 sec | | 2 rpm 10 sec. stop 10 sec | 4 rpm 10 sec. stop 30 sec | | 4 rpm 20 sec. stop 20 sec |
| Sticking defect rate (%) | 0 | 0 | 0 | 0 | 0 | 0 | 0 | 0 |
| Rate of Bend (%) | 0–5 | 0–4 | 0–5 | 0–6 | 0–4 | 0–4 | 1–5 | 0–4 |
| Surface roughness (μm) bend (μm) | 4.6 | 3.5 | 3.3 | 5.1 | 3.6 | 3.2 | 5.5 | 3.3 |
| Varistor Voltage (V) | 25 | 24 | 23 | 27 | 25 | 26 | 24 | 26 |
| Standard deviation (V) | 0.8 | 0.4 | 0.3 | 0.9 | 0.5 | 0.4 | 0.8 | 0.5 |

It should be apparent from Table 14, that if the rotating speed per unit time is same, the uniformity of the varistor voltage is improved, the surface roughness is smaller, and the sticking defect and the rate of bend are not increased in intermittent rotation as compared with continuous rotation.

Embodiment (12)

Figure 4:
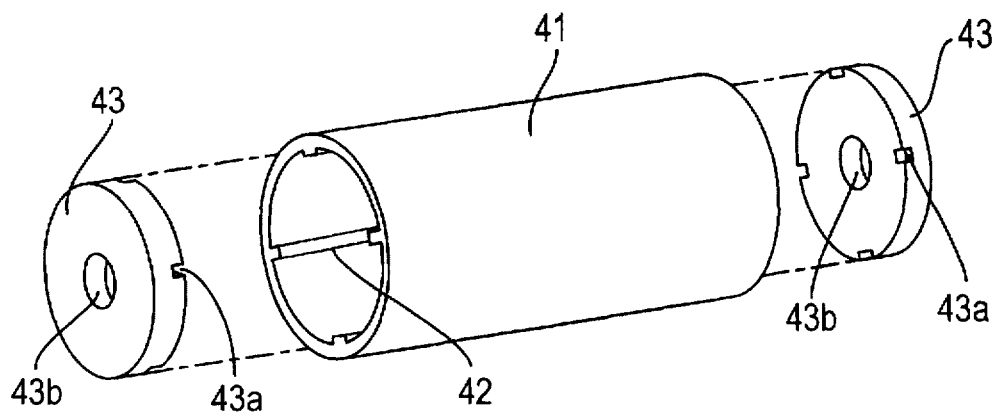
FIG. 4 is a perspective exploded view of a cylindrical heat resistant container in embodiment (12).
Figure 5A:
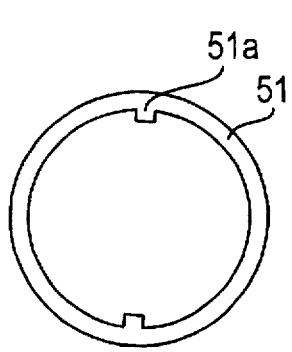
FIG. 5(a) is a sectional view of an example of cylindrical heat resistant container in embodiment (12).
Figure 5B:
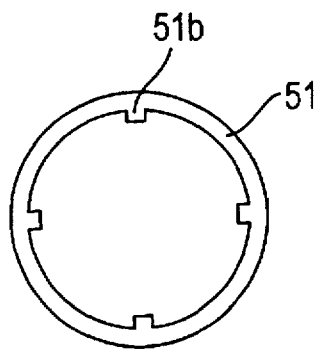
FIG. 5(b) is a sectional view of other example of cylindrical heat resistant container in embodiment (12).
Figure 5C:
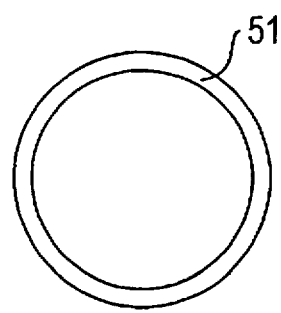
FIG. 5(c) is a sectional view of a different example of cylindrical heat resistant container in embodiment (12).

Embodiment 12 is described below with reference to FIGS. 4, 5(a), 5(b) and 5(c). FIG. 4 is a structural diagram of a cylindrical heat resistant container. FIGS. 5(a), 5(b), and 5(c) are sectional views of three types of cylindrical heat resistant containers. In FIG. 4, a heat resistant container comprises a heat resistant tube 41, a band protrusion 42, a heat resistant lid 43, a band protrusion fitting groove 43a, and vent hole 43b. FIGS. 5(a), 5(b), and 5(c) show the cross-sections or shapes of three different containers. In FIG. 5(a), band protrusions 51a are formed in a heat resistant tube 51. In FIG. 5(b), band protrusions 51b are formed in a heat resistant tube 51. In FIG. 5(c), no band protrusions 51b are formed in a heat resistant tube 51. The type of the protrusion can differ.

Three types of heat resistant containers comprising a high purity alumina tube 41, 30 mm in inner diameter and 100 mm in length, and similar high purity alumina heat resistant lids 43, having a circular section as shown in FIGS. 5(a)–(c) were prepared. The height and width of band protrusions 51a and 51b in the bus direction of the inner wall of the heat resistant tube 41, as shown in FIGS., 5(a) and 5(b), respectively, were both 3 mm. Into these heat resistant containers, circular columnar ceramic forms, 2 mm in diameter and 4 mm in height, comprising Mn—Co—Ni—O derivative thermistor material, were charged to an apparent volume percentage of 40%, and fired in the same manner as specified for embodiment (1), using a lateral tubular furnace. The temperature was raised to 500° C. at a rate of 100° C. per hour, and held for 2 hours at 500° C. to burn out the binder in the forms. Next, the temperature was further raised to 1280° C. at a rate of 500° C. per hour, and held at 1280° C. for 1 hour. Then the furnace was cooled to room temperature at a rate of 400° C. per hour. Upon reaching 1000° C. in the heating process, rotation of the furnace core tube was started at a rate of three revolutions per minute. The rotation was stopped when the temperature declined to 800° C. in the cooling process.

Table 15 shows the sticking defect rates, resistance at room temperature, and its standard deviation, B constant, and its standard deviation of B constant using the different containers depicted in FIGS. 5(a)–(c).

TABLE 15

| Sectional shape of heat resistant tube | Fig. 5 (1) | Fig. 5 (2) | Fig. 5 (3) |
|---|---|---|---|
| Sticking defect rate (%) | 0 | 0 | 0 |
| Resistance at room temperature (Ω · cm) | 500 | 505 | 501 |
| Standard deviation of resistance at room temperature (Ω · cm) | 23 | 20 | 45 |
| B constant (K) | 3550 | 3510 | 3540 |
| Standard deviation of B constant (K) | 60 | 57 | 120 |

It should be apparent from Table 15, that by using the heat resistant tube shown in FIG. 5(a) or 5(b) having the band protrusion 51a, 51b, respectively, in the inner wall, agitation during rotation is uniform, as compared with the heat resistant tube without any band protrusion, as shown in FIG. 5(c). Therefore, containers with band protrusions provide the distinct advantage of suppressing sticking defects and fluctuations of electric characteristics.

In order to be effective, a container should be provided with one or more band protrusions. If more than one protrusion band is provided, the interval between the bands need not be uniform. The size and shape of a protrusion may depend on the size of the ceramic forms. The object in arriving at a particular size and shape of the protrusion band is to achieve a uniform stirring of the ceramics being fired.

Embodiment (13)

Figure 6:
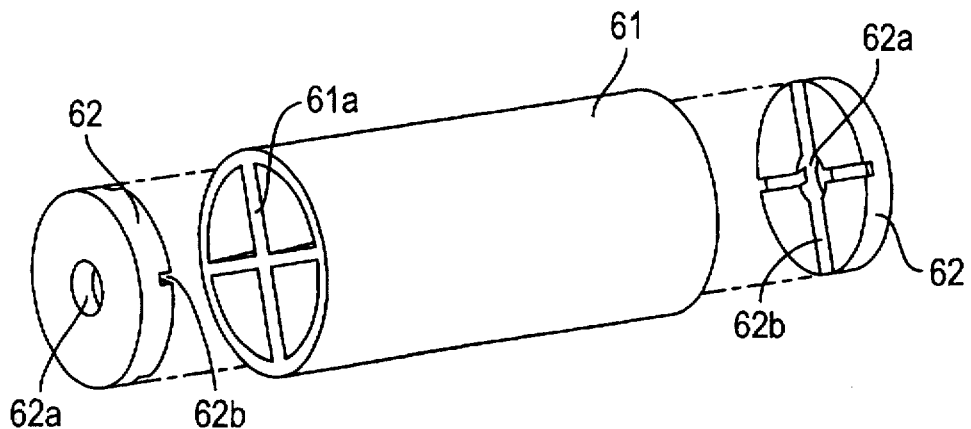
FIG. 6 is a perspective exploded view of a cylindrical heat resistant container in embodiment (13).

Embodiment 13 is described below while referring to the drawing. FIG. 6 is a structural diagram of a cylindrical heat resistant container that represents embodiment (13) of the present invention. The container comprises a heat resistant tube 61, a separation wall 61a, heat resistant lids 62, vent holes 62a, and separation wall fitting grooves 62b.

The heat resistant tube 61 is made of high purity alumina, 80 mm in inner diameter and 300 mm in length. The heat resistant lids are 62 also made of high purity alumina. The inside of the heat resistant tube 61 is divided into four sections by the 2 mm thick cross separation walls 61a. As a comparative example, a heat resistant tube without any separation walls 61a was also prepared. Into these two types of heat resistant containers, disk form ceramic forms of 0.62 mm in thickness, varying in diameter, made of $BaTiO_3$ derivative material were charged to an apparent volume percentage of 65%. The ceramic forms were fired according to the same method and same firing conditions as specified for embodiment (1) of the invention.

Table 16 shows the results of measuring the of sticking defect rates, cut defect rates, and amount of bend of the ceramics fired in the two containers.

TABLE 16

| Type of heat resistant tube | 4 sections | | | | Not divided | | | |
| --- | --- | --- | --- | --- | --- | --- | --- | --- |
| Ceramic form diameter (mm) | 15 | 20 | 25 | 30 | 15 | 20 | 25 | 30 |
| Sticking defect rate (%) | 0 | 0 | 1 | 9 | 1 | 2 | 2 | 4 |
| Cut defect rate (%) | 0 | 0 | 0 | 0 | 2 | 4 | 9 | 16 |
| Amount of bend (μm) | 15 | 17 | 23 | 118 | 12 | 14 | 21 | 25 |

It should be apparent from Table 16, that when the inside of the cylindrical heat resistant tube 61 is divided into four sections, the sticking defects and-cut defects are smaller than when the inside of the container is not divided. In particular, if a container is used that is not divided, the ceramic forms are stacked up excessively, bearing the pressure of their own weight during the heating process prior to the rotation of the container. Hence, sticking is likely to occur, and then when the rotation is started, the effect of the rotation and stacking will most likely result in many of the ceramics being cut. On the other hand, when the diameter (32 mm) of the inscribed circle of the sectors, obtained by dividing the inside of the heat resistant tube into four sections, is larger than 1.1 times the diameter of the ceramic forms, i.e., when the diameter of the ceramic forms is 30 mm, the rotary motion of the ceramic forms is confined, sticking defects and amount of bend will increase suddenly.

In this embodiment (13), the inside of the heat resistant tube 61 is show as divided into four sections. However, the inside of the container is not limited to four sections. The inside of the container can be divided into plural sections, with the same advantages being obtained. Moreover, the size of each section does not have to be identical.

Embodiment (14)

Figure 7:
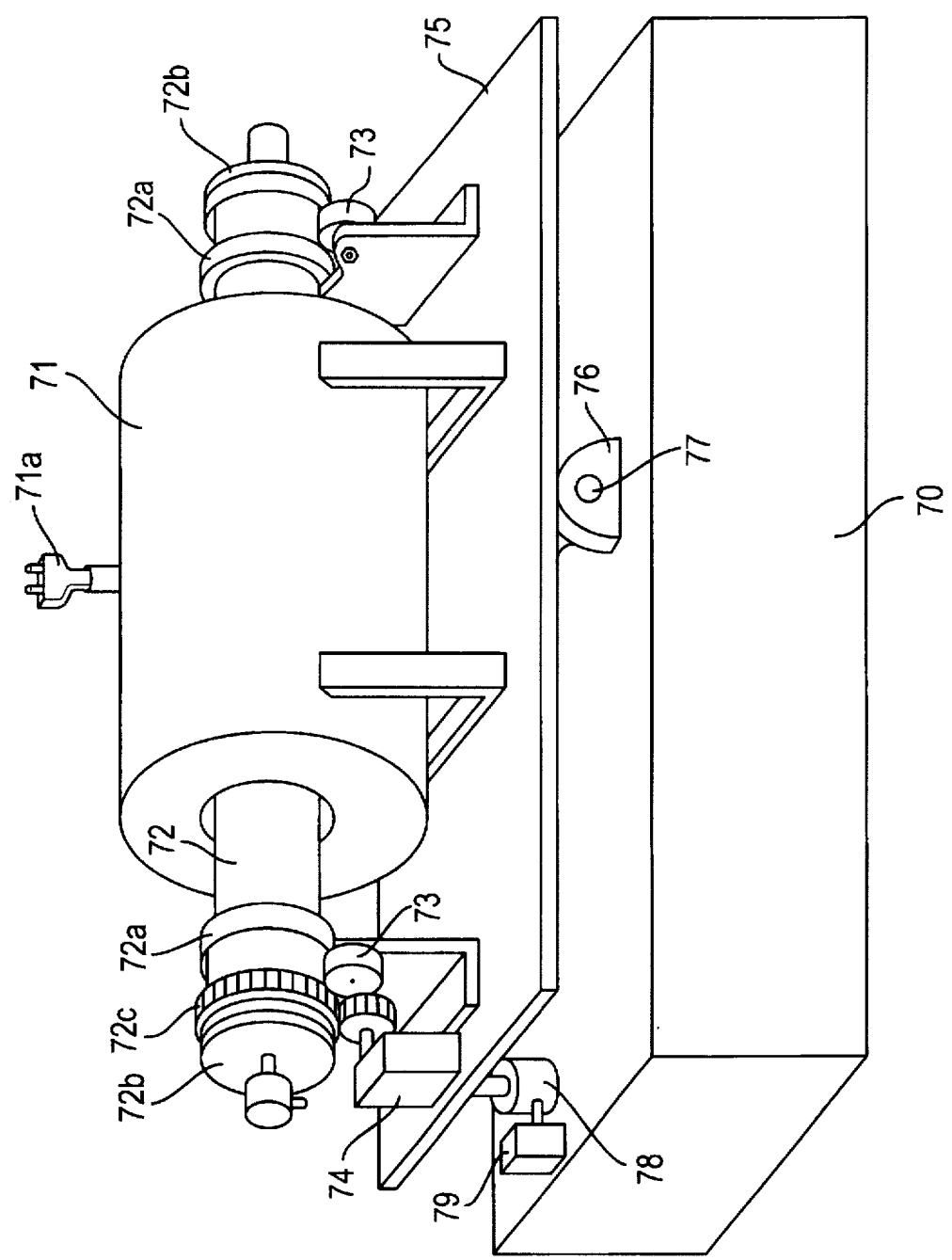
FIG. 7 is a schematic diagram of a furnace in embodiment 14.
Figure 8:
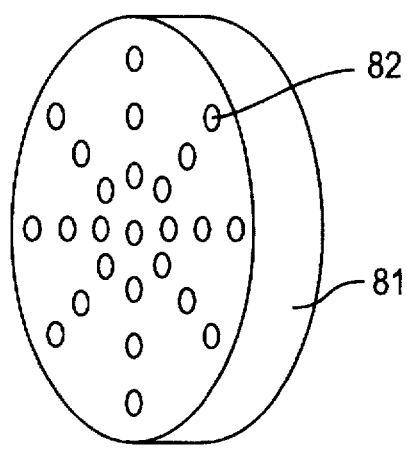
FIG. 8 is a perspective view of a heat resistant lid in embodiment (14).
Figure 9:
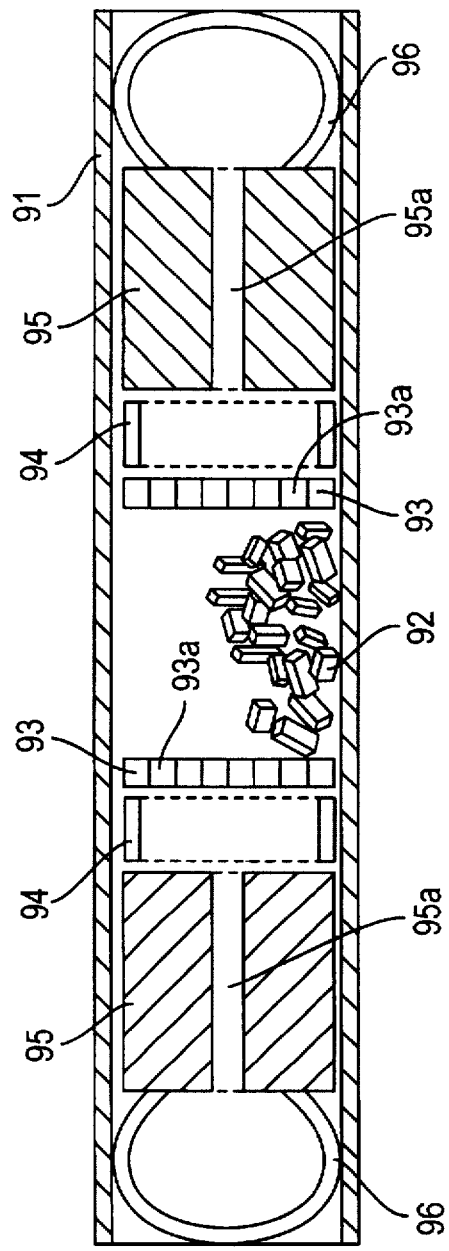
FIG. 9 is a sectional view of inside of a furnace core tube in embodiment (14).

Embodiment (14) of the invention is described below with reference to FIGS. 7–9. FIG. 7 is a schematic view of a furnace according to embodiment (14) of the invention. FIG. 8 is a perspective view of a heat resistant lid, and FIG.9 is a sectional view of the inside of a furnace core tube. In FIG. 7, FIG. 8, and FIG. 9, the furnace comprises a temperature controller 70, a furnace body 71, a thermocouple 71a, a furnace core tube 72, fixtures with O-rings 72a, metal lids with rotary joint 72b, a gear for rotation of the furnace core tube 72c, a furnace core tube support roller 73, a motor for rotation of furnace core 74, a furnace core placing plate 75, a BEFRING 76, a metal bar 77, a piston 78, and a piston drive motor 79. In FIG. 8, a heat resistant lid 81 has a plurality of vent holes 82. In FIG. 9, the furnace comprises a furnace core tube 91, ceramic forms 92, heat resistant lids 93, vent holes 93a, heat resistant rings 94, fire bricks 95, vent holes 95a, and positioning fittings 96.

The central portion of the furnace core tube 91 is made of high purity alumina, and is 300 mm in length with a 50 mm in inner diameter. The furnace core is 1000 mm in length. Laminate ceramic forms 92, 4.0 mm in on the longer side, 2.0 mm in on the shorter side, and 1.25 mm in thickness of two effective layers comprising (Mg, Ca) TiO$_3$ derivative dielectric material and Pd internal electrode were packed in the central portion of the core to an apparent volume percentage of 70%. Next, the heat resistant lids 93, heat resistant rings 94, and fire bricks 95 were inserted; and the positioning fittings 96 were fixed. The firing was conducted in the furnace shown in FIG. 7. In the heat resistant lid 93 and fire bricks 95, a multiplicity of vent holes 82, 2 mm in diameter, as shown in FIG. 8, were provided. Air was sent into the furnace core tube 91 and circulated therein through the central portion at a rate of 100 ml per minute. The furnace temperature was raised at a rate of 25° C. per hour up to 500° C. The temperature was held at 500° C. for 2 hours to burn out the binder in the ceramic forms. Then, the temperature was raised up to 1300° C. at a rate of 200° C. per hour, and held at 1300° C. for 2 hours. Next, the temperature was cooled to room temperature at a rate of 200° C. per hour. Upon reaching 1150° C. in the heating process, the furnace core tube 72 was rotated at a rate of one revolution per minute, and the piston 78 was moved at one end of the furnace body placing plate 75. As a result, the plate was moved up and down, or inclined, or rocked, from a fixed horizontal level. The entire furnace body 71 was inclined to a maximum angle of ±10 degrees, and a seesaw motion was repeated periodically in every cycle of 5 minutes. When the temperature declined to 800° C. in the cooling process, the rotation of furnace core tube 72 and seesaw motion of furnace body 71 were stopped. The furnace was cooled to room temperature while holding the furnace core tube 72 level.

For comparison purposes, the firing process was repeated without the seesaw motion of the furnace body 71; but only with the method of rotating the furnace core tube 72.

Table 17 shows the results of measuring the sticking defect rates, the electrostatic capacity and its standard deviation of the ceramics fired under the conditions specified above for embodiment (14).

TABLE 17

| Seesaw motion of furnace body | Present | Absent |
| --- | --- | --- |
| Sticking defect rate (%) | 0 | 0 |
| Electrostatic capacity (pF) | 102 | 101 |
| Standard deviation (pF) | 2.3 | 5.8 |

It should be apparent from Table 17, that the use of a seesaw motion for the furnace body 71, as compared with the non-use of such a motion, the fluctuations in the standard deviation are decreased to less than half; although there is no evident difference in sticking defect rates and electrostatic capacity. It appears that the agitation of the ceramic forms 92 in the furnace core tube 91 is promoted by the seesaw motion of the furnace body 71 to cancel the slight difference in temperature or atmosphere due to a difference in the positions of the ceramic forms inside the furnace core tube 91. As a result, the uniformity of electric characteristics is enhanced by the seesaw motion, as compared with the case where the furnace core tube 91 is only rotated.

In all foregoing embodiments of the invention, high purity alumina excellent in uniform heating capacity was used as the material for the cylindrical heat resistant container. However, as alternates, magnesia, zirconia, or silicon carbide may be also used. Moreover, depending on the firing temperature, of course, metals such as nickel and inconel may be also used.

For ceramic forms, any ceramic materials may be used. Moreover, the present invention is not limited to forms made of ceramic materials alone. The forms may be also formed as a complex body with metal such as alternating laminates of internal electrode layers and ceramic layers. Also, the shape of the forms can vary.

The temperature at which rotation is started and ended varies with the ceramic materials being used. However, it is preferred to start the rotation when the mechanical strength of the forms has been increased so that cracks or cuts may not be formed in the forms by the mutual collision of ceramic forms in the firing process. Also, it is preferred to end or finish the rotation when forms have cooled to temperature that will result in the ceramic forms not sticking to each other. For example, it is preferred to start the rotation at about 1100° C. if the ceramic forms mainly comprise $BaTiO_3$; at about 1000° C., if the forms contain lead; and at 700° to 800° C., if the forms mainly comprise ZnO.

The speed of rotation is not necessarily required to be constant, but it is easier to control when set at a constant speed.

Thus, according to the invention, after increasing the mechanical strength of ceramic forms is first increased by the promotion of sintering. Then, the ceramic forms are placed in a cylindrical heat resistant container in a specified temperature region and heated to a maximum firing temperature. The cylindrical heat resistant container is rotated about a horizontal central shaft within a predetermined firing or temperature range. This firing process and furnace provides the advantages of producing excellent ceramics that do not stick, are not deformed, broken or abraded, and that are capable of mass producing the ceramics forms with uniform characteristics.

Of course, it should be understood that a wide range of changes and modifications can be made to the preferred embodiment described above and that the foregoing description be regarded as illustrative rather than limiting. It is therefore intended that it is the following claims, including all equivalents, which are intended to define the scope of this invention.

What is claimed is:

1. A method for firing ceramic forms, comprising the steps of:

(1) increasing a mechanical strength of the ceramic forms by performing a first firing on the ceramic forms; and (2) performing a second firing on the ceramic forms that have been mechanically strengthened, while rotating a cylindrical heat resistant container containing the ceramic forms about its horizontal central shaft as rotary shaft, limiting the second firing to a temperature region, including a maximum firing temperature.

2. The firing method of claim 1, wherein said cylindrical heat resistant container includes a soaking portion of a furnace core tube of a lateral tubular furnace and heat resistant lids at both ends of said container.

3. The firing method of claim 1, wherein said cylindrical heat resistant container is rotated at a speed of about 0.01 to 10 revolutions per minute.

4. The firing method of claim 1, wherein said cylindrical heat resistant container is rotated intermittently.

5. The firing method of claim 1, wherein said cylindrical heat resistant container has a cylindrical inner wall with at least one band protrusion formed in a lateral direction along the length of said cylindrical inner wall.

6. The firing method of claim 1, wherein said cylindrical heat resistant container has a circular section divided into sector compartments, and wherein a diameter of an inscribed circle formed around said sector compartments is 1.1 times or more larger than a longest portion dimension of the ceramic forms that are strengthened.

7. The firing method of claim 1, further comprising the step of:

periodically inverting an inclination of the rotary shaft to make a seesaw motion simultaneously with the rotation of said cylindrical heat resistant container.

8. The firing method of claim 1, wherein said ceramic forms comprise ceramic material that does not generate a liquid phase or splash during at least one of the first firing and the second firing.

9. A method of firing ceramic forms, comprising the steps of:

(1) packing ceramic forms into a cylindrical heat resistant container;

(2) firing said packed ceramic forms a first time to increase a mechanical strength of said ceramic forms;

(3) firing ceramic forms a second time; and cooling said ceramic forms, wherein said cylindrical heat resistant container is rotated about a horizontal central shaft as rotary shaft of said container, within a temperature range, said range starting with a temperature higher than that at which the mechanical strength of said ceramic forms begins to increase, said range including a maximum firing temperature, and said range ending with a cooling temperature, and wherein an inner diameter of said cylindrical heat resistant container is 1.5 times or more larger than a longest portion dimension of said ceramic forms, and wherein said ceramic forms are packed in said cylindrical heat resistant container at an apparent volume percentage of 40% or more before said first firing, and wherein said ceramic forms are fired in said cylindrical heat resistant container at an apparent volume percentage of 90% or less after said second firing.

10. A method of firing ceramic forms, comprising the steps of:

(1) calcining ceramic forms at a first firing temperature to increase a mechanical strength of said ceramic forms;

(2) packing calcinized ceramic forms into a cylindrical heat resistant container having a horizontal central shaft; and (3) firing the packed-calcinized ceramic forms, while rotating said cylindrical heat resistant container about its horizontal central shaft as a rotary shaft, within a temperature region including a maximum firing temperature, wherein an inner diameter of said cylindrical heat resistant container is 1.5 times or more larger than a longest portion dimension of said ceramic forms, wherein said first firing temperature is lower than said maximum firing temperature, and wherein an apparent volume of said ceramic forms after said step (3) is 90% or less.

11. A method of firing ceramic forms, comprising the steps of:

packing plate form ceramic forms into a cylindrical heat resistant container at an apparent volume percentage of 40% or more;

firing said packed plate form ceramic forms; and further firing said plate form ceramic forms and cooling said plate form ceramic forms wherein said cylindrical heat resistant container is rotated about a horizontal central shaft as rotary shaft, within a temperature range, said range starting with a temperature higher than that at which a mechanical strength of said ceramic forms begins to increase, said range including a maximum firing temperature, and said range ending with a cooling temperature, wherein an inner diameter of said cylindrical heat resistant container is 1.5 times or more larger than a longest portion dimension of said plate form ceramic forms, and wherein said plate form ceramic forms are fired in said cylindrical heat resistant container at an apparent volume percentage of 90% or less after said further firing.

12. The firing method of claim 11, wherein said plate form ceramic forms are disk form ceramic forms, and wherein a ratio of diameter of said disk form ceramic forms to a thickness of said disk form ceramic forms is 3 or more.

13. The firing method of claim 11, wherein said plate form ceramic forms are rectangular plate form ceramic forms, and wherein a ratio of a diagonal length of the rectangular plate form ceramic forms to a thickness of said rectangular plate form ceramic forms is 3 or more.

14. A method of firing ceramic forms, comprising the steps of:

packing columnar ceramic forms into a cylindrical heat resistant container at an apparent volume percentage of 40% or more;

firing said packed columnar ceramic forms; and further firing said packed columnar ceramic forms and cooling said packed columnar ceramic forms, wherein said cylindrical heat resistant container is rotated about a horizontal central shaft as rotary shaft, within a temperature range, said range starting with a temperature higher than that at which a mechanical strength of said columnar ceramic forms begins to increase, said range including a maximum firing temperature, and said range ending with a cooling temperature, wherein an inner diameter of said cylindrical heat resistant container is 1.5 times or more larger than a longest portion dimension of said columnar ceramic forms, and wherein said columnar ceramic forms are fired in said cylindrical heat resistant container at an apparent volume percentage of 90% or less after said further firing.

15. The firing method of claim 14, wherein said columnar ceramic forms are circular columnar ceramic forms, and wherein a ratio of a diameter at both ends of the circular columnar ceramic forms to a height of said circular columnar ceramic forms is ¾ or less.

16. The firing method of claim 14, wherein said columnar ceramic forms are rectangular columnar ceramic forms, and a ratio of a diagonal length of the rectangular columnar ceramic forms at both ends to a height of said rectangular columnar ceramic forms is ¾ or less.

17. A method of firing ceramic forms, comprising the steps of:

calcining plate form ceramic forms at a first firing temperature to increase a mechanical strength of said plate form ceramic forms;

packing the calcinized plate form ceramic forms into a cylindrical heat resistant container having a horizontal central shaft; and firing the packed-calcinized plate form ceramic forms, while rotating said cylindrical heat resistant container about its horizontal central shaft as a rotary shaft, within a temperature region including a maximum firing temperature, wherein an inner diameter of said cylindrical heat resistant container is 1.5 times or more larger than a longest portion dimension of said plate form ceramic forms, wherein an apparent volume of said ceramic forms after said step of firing is 90% or less.

18. The firing method of claim 17, wherein said plate form ceramic forms are disk form ceramic forms, and wherein a ratio of diameter of the disk form ceramic forms to a thickness of said disk form ceramic forms is 3 or more.

19. The firing method of claim 17, wherein said plate form ceramic forms are rectangular plate form ceramic forms, and wherein a ratio of diagonal length of the rectangular plate form ceramic forms to a thickness of said rectangular plate form ceramic forms is 3 or more.

20. A method of firing ceramic forms, comprising the steps of:

calcining columnar ceramic forms at a first firing temperature to increase a mechanical strength of said columnar ceramic forms;

packing the calcinized columnar ceramic forms into a cylindrical heat resistant container having a horizontal central shaft;

firing the packed-calcinized columnar ceramic forms, while rotating said cylindrical heat resistant container about the horizontal central shaft as a rotary shaft, within a temperature region including a maximum firing temperature, wherein an inner diameter of said cylindrical heat resistant container is 1.5 times or more larger than a longest portion dimension of said columnar ceramic forms, and wherein an apparent volume of said ceramic forms after said step of firing is 90% or less.

21. The firing method of claim 20, wherein said columnar ceramic forms are circular columnar ceramic forms, and wherein a ratio of diameter at both ends of the circular columnar ceramic forms to a height of said circular columnar ceramic forms is ¾ or less.

22. The firing method of claim 20, wherein said columnar ceramic forms are rectangular columnar ceramic forms, and wherein a ratio of a diagonal length of the rectangular columnar ceramic forms to a height of said rectangular columnar ceramic forms is ¾ or less.

* * * * *